(12) United States Patent
Gallucci et al.

(10) Patent No.: US 7,411,014 B2
(45) Date of Patent: Aug. 12, 2008

(54) STABILIZATION OF POLYETHERIMIDE SULFONES

(75) Inventors: Robert R. Gallucci, Mt. Vernon, IN (US); Jon M. Malinoski, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 439 days.

(21) Appl. No.: 11/148,612

(22) Filed: Jun. 9, 2005

(65) Prior Publication Data

US 2006/0281840 A1    Dec. 14, 2006

(51) Int. Cl.
*C08K 5/53* (2006.01)

(52) U.S. Cl. .................. 524/130; 524/133; 524/135; 524/147; 524/150; 524/151; 524/152; 524/153

(58) Field of Classification Search .......... 524/130, 524/133, 135, 147, 150–153
See application file for complete search history.

(56) References Cited

U.S. PATENT DOCUMENTS

| 2,991,273 | A | 7/1961 | Hechelhammer et al. |
| 2,999,835 | A | 9/1961 | Goldberg |
| 3,028,365 | A | 4/1962 | Schnell et al. |
| 3,148,172 | A | 9/1964 | Fox |
| 3,271,367 | A | 9/1966 | Schnell et al. |
| 3,271,368 | A | 9/1966 | Goldberg et al. |
| 3,825,629 | A | 7/1974 | Hofer et al. |
| 3,962,175 | A | 6/1976 | Hofer et al. |
| 4,075,163 | A | 2/1978 | Hofer et al. |
| 4,835,249 | A | 5/1989 | Gallagher et al. |
| 4,910,288 | A | 3/1990 | Dellacoletta |
| 7,041,773 | B2 * | 5/2006 | Gallucci et al. ............. 528/170 |
| 7,128,959 | B2 * | 10/2006 | Borst et al. ................. 428/64.4 |

OTHER PUBLICATIONS

Chao, "A31P NMR study of poly(phenylene oxide) (PPO) (1) resin's hydrosyl end groups" Polymer Bulletin 17, 397-401 (1987).
Kim, et al. "Kinetic an dMechanistic Investigations of the Formation of Polyimides under Homogeneous Conditions" Marcomolecules 1993, 26, 1344-1358.
Kreuz, et al. "Studies of Thermal Cyclizations of Polyamic Acids and Tertiary Amine Salts" Journal of Polymer Science: Part A-1, vol. 4, 2607-2616 (1996).
Chan, et al. "Facile Quantitative Analysis of Hydroxyl End Groups of Poly(2,6-dimethyl-1,4-phenylene oxide)s by 31P NMR Spectroscopy" Macromolecules 1994, 27, 6371-6375.
ASTM D3835-96 "Standard Test Method for Determination of Properties of Polymeric Materials by Means of a Capillary Rheometer" pp. 483-494.

* cited by examiner

*Primary Examiner*—Peter Szekely
(74) *Attorney, Agent, or Firm*—Cantor Colburn LLP

(57) ABSTRACT

A composition comprising a phosphorus containing stabilizer and a polyetherimide sulfone resin having an amount of anhydride functional end groups in excess of the amount of amine functional end groups. The composition may optionally comprise a hindered phenol.

21 Claims, 2 Drawing Sheets

Torque vs. Time at 425°C for Amine Rich PEIS Resins

Torque vs. Time at 425°C for Anhydride Rich PEIS Resins

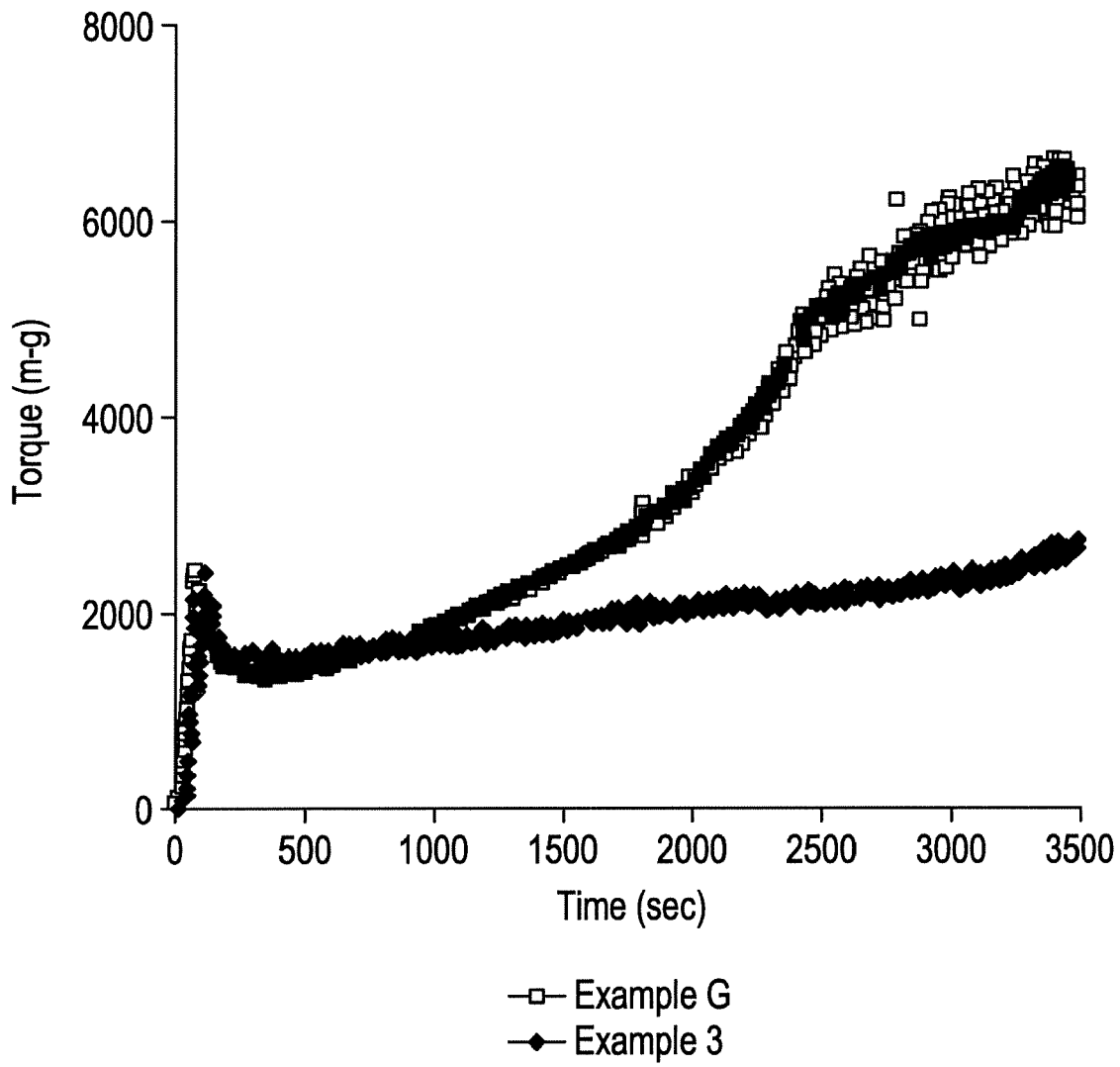

US 7,411,014 B2

STABILIZATION OF POLYETHERIMIDE SULFONES

BACKGROUND OF INVENTION

Polyimides are known to be useful high performance polymers. Polyetherimide sulfones are a particular class of polyimides which combine the high temperature characteristics of polyimides but still have sufficient melt processability to be formed by conventional molding techniques such as compression molding, gas assist molding, profile extrusion, film extrusion, thermoforming and injection molding. Good melt processability is a key attribute for polyetherimides. It allows them to be quickly and easily formed into articles by extrusion and molding processes. Polyetherimide sulfones with higher heat capability, as reflected in higher glass transition temperature (Tg), are desirable to replace traditional materials of construction such as metal, glass and ceramic. However as higher Tgs are obtained the temperatures needed to melt these polymers and form them into items increases. At these extremely high melt processing temperatures even the most stable polymer linkages can decompose. In polyetherimide sulfones such instability is often indicated by a rise in melt viscosity or an increase in the energy needed to stir or push the molten polymer. This is especially problematic, as the increasing viscosity requires more mechanical work to move the melt generating more heat through friction, giving even higher temperatures that cause further resin degradation. In some cases this resin melt instability results in so much degradation that the polyetherimide sulfone is no longer a thermoplastic; it is crosslinked into infusible crumbs and cannot be formed into articles. Thus there is an ongoing need to improve the melt stability of high Tg (>250° C.) polyetherimide sulfones.

BRIEF DESCRIPTION OF THE INVENTION

A composition comprising a phosphorus containing stabilizer and a polyetherimide sulfone resin having anhydride end groups in an amount that is in excess of the amount of amine end groups. The composition may optionally comprise a hindered phenol.

BRIEF DESCRIPTION OF THE DRAWINGS

FIG. 3 is a graph that shows the torque vs. time at 400° C. for two anhydride functional polyetherimide sulfone examples.

DETAILED DESCRIPTION

Figure 1:
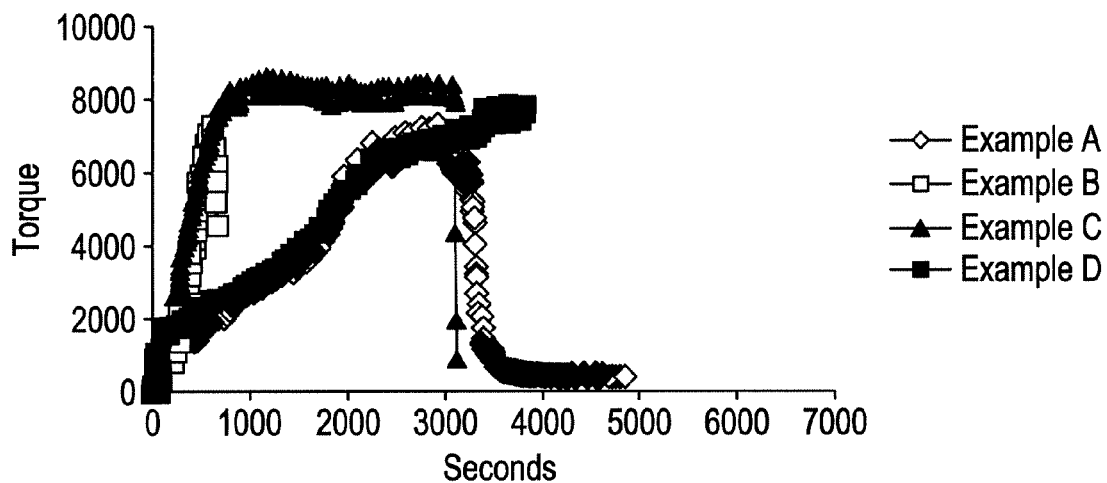
FIG. 1 is a graph that shows the torque vs. time at 420° C. for a series of amine functional polyetherimide sulfone control examples.

In this specification and in the claims that follow, reference will be made to a number of terms that shall be defined to have the following meaning. The singular forms "a", "an" and "the" include plural referents unless the context clearly dictates otherwise. "Optional" or "optionally" mean that the subsequently described event or circumstance may or may not occur, and that the description includes instances where said event or circumstance occurs and instances where it does not.

Surprisingly phosphorus containing stabilizers, especially aryl phosphonates, are very effective in reducing the rate of viscosity increase in polyetherimide sulfone resins but only when the polymer has an excess of anhydride end groups when compared to the amount of amine end groups. Polyetherimide sulfone resins with an excess of amine end groups do not show the same reduction in the rate of viscosity increase. Use of phosphorus containing stabilizers in combination with hindered phenol compounds is even more effective in preventing viscosity increase in molten polyetherimide sulfone, but again, only when the resin has an excess of anhydride end groups when compared to the amount of amine end groups.

Polyimide resins can be made by condensation of diamine with dianhydrides or chemical equivalents, in many cases aryl dianhydrides and aryl diamines are preferred to give resins with better resistance to heat. If the molar ratio of the diamine and dianhydride is not balanced polymers which have and excess of amine or anhydride end groups may be produced. This imbalance of diamine and dianhydrides can be intentional or accidental. Slight errors in weighing ingredients, impurities or solvent in either difunctional compound, possible side reactions of either difunctional compound not resulting in polymerization, selective volatilization or precipitation of one compound from the reaction mixture, as well as other causes can lead to polyimides with an excess of one functionality over the other.

Even when mono functional compounds, such as phthalic anhydride or aniline, are used to control molecular weight by providing a non-reactive end group, as described in U.S. Pat. No. 4,910,288 and U.S. Published Patent Application No. 2004/0260055, it is still possible to have amine or anhydride functionality, or a mixture of both indicating incomplete polymerization. These reactive amine and anhydride functionalities are often located on the end of the polymer chains and can have a strong influence on properties such as melt viscosity, color and melt stability.

We have found that diamines that are less nucleophilic, for instance those which are substituted with electron withdrawing groups such as sulfo, nitro, chloro or keto groups, tend to be less reactive with aryl dianhydrides. In some instances this may give polyimides that may have higher reactive end group concentration, possibly by a lesser extent of reaction. Diamino aryl sulfones, such as diamino diphenyl sulfone (DDS), fall into this category of less reactive aryl diamines. Without being bound by theory, conjugation of the amine with an electron withdrawing group, for instance the sulfone group, is thought to reduce the diamine's ability to react with the dianhydride. Independent of any chemical mechanism, it has been observed that polyimides made using electron deficient diaryl diamines substituted with electron withdrawing groups can give higher levels of amine and anhydride end groups than more nucleophilic diamines substituted with electron donating groups, such as diamino diphenyl ether, or diamino diphenyl methane. Thus different classes of diamines may give polyimides with different distributions of reactive end groups.

Polyetherimide sulfones with higher amounts of reactive end groups can have issues with poor melt stability. This is especially true of high glass transition temperature (Tg) resins, (Tg≧250° C.), which are subjected to higher processing temperatures and/or are subjected to conditions of higher shear than polyimides with a lower Tg. Polyetherimide sulfone resins having a high Tg may not show good melt stability; upon heating at 350° C. to 450° C. the molten resins frequently show an increase in viscosity and become hard to move. This is a major issue when trying to form molded parts, films or sheets through a melt process such as extrusion, gas assist or injection molding.

In an attempt to stabilize polyetherimide sulfones a very surprising phenomenon has been observed. In polyetherimide sulfones having an excess of amine end groups compared to the amount of anhydride end groups, the addition of phosphorus containing compounds, such as phosphonites, gave very poor melt stability. The increase in melt viscosity as evidence by the torque needed to stir a molten polyetherimide sulfone at about 400 to 420° C., was sharply increased compared to the resin with no additive as shown in FIG. 1. After a few minutes, the resin totally crosslinked into an non-fusible solid and was no longer thermoplastic. The non-fusible solid crumb shows little or no resistance to mixing, and the torque rapidly drops to about zero. Addition of a phosphorus containing stabilizer compound actually results in a faster torque increase than exhibited in the same resin without the phosphorous containing additive. This behavior would make it difficult to form parts in a melt process.

Figure 2:
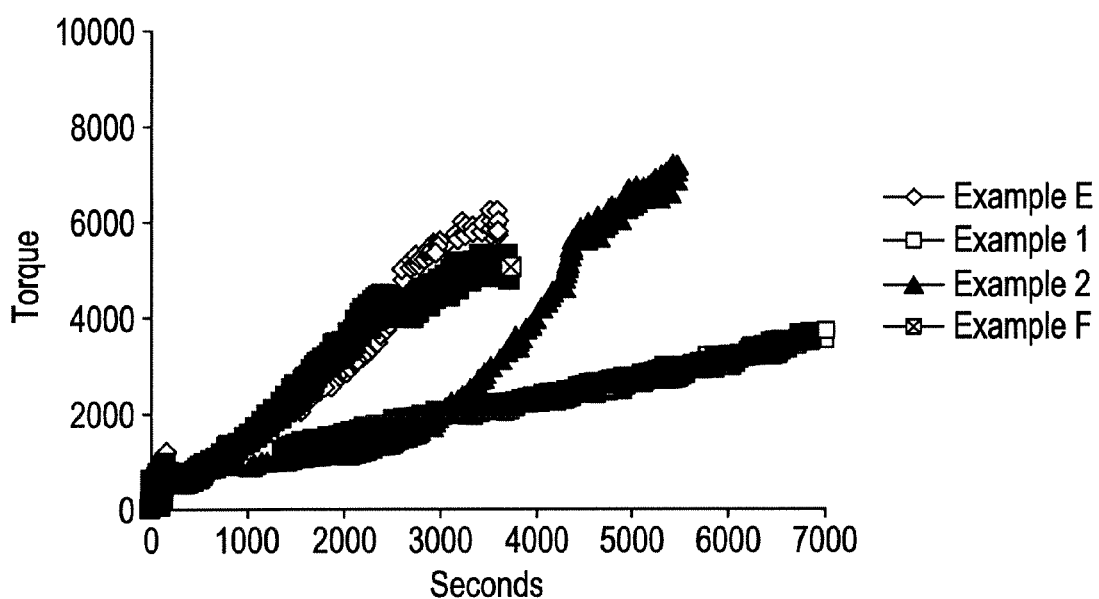
FIG. 2 is a graph that shows the torque vs. time at 420° C. for a series of anhydride functional polyetherimide sulfone examples.

On the other hand addition of a phosphorus containing stabilizer to a similar polyetherimide sulfone made with an excess of anhydride end groups gave a totally different response. The phosphorus based additive gave an improvement of melt viscosity over the base resin with no additive as evidenced by the torque vs. time at 420° C. plot shown in FIG. 2. Even after 120 minutes of heating with stirring, the resin is still thermoplastic and has not crosslinked. This indicates good thermal processability in the melt.

In other instances an anhydride functionalized polyetherimide sulfone and phosphorus containing stabilizer were further combined with a hindered phenol compound. Again the torque vs. time at 420° C. was measured. FIG. 3 shows that the resin with excess anhydride end groups shows a further improvement in melt stability (less torque increase) than does the resin having excess anhydride end groups and phosphorus containing compound alone. However this is not observed in the case of polyetherimide sulfone having excess amine end groups where a rapid increase in torque followed by crosslinking is still observed even using the phosphorus containing compound/hindered phenol compound combination.

Melt viscosity stabilization is very important in high Tg polymers since they will need to be melt processed at higher temperatures to soften sufficiently to flow and made into a shaped article. Higher temperatures increase the rate of reaction of the amine and anhydride end groups. These high temperatures, typically 350-450° C., place special requirements on the phosphorus containing compounds and the hindered phenol compounds as well as the polyetherimide sulfone resins. The phosphorus containing compounds and the hindered phenol additives must have low volatility and good thermal stability so they are not substantially decomposed or volatized from the polyetherimide sulfone melt and thus are unable to prevent the melt viscosity increase. In some instances aryl phosphonate containing compounds can be used. In other instances aryl phosphonite or aryl phosphite compounds are effective. Difunctional phosphorus containing compounds can also be employed. In some instances the composition comprises hindered phenolic compounds that are tri-functional or tetra-functional. Stabilizers with a molecular weight of greater than or equal to about 500 are preferred. In other cases hindered phenolic and phosphorus containing stabilizers with a molecular weight of greater than or equal to 1000 are useful.

The hindered phenol and phosphorus containing compounds can be of any effective amount to prevent a significant increase of melt viscosity or crosslinking. In some instances the amount of each compound, or mixture thereof, can be 0.01 to 5.0% of the whole composition by weight. In other instances the amount of these compounds can be 0.1 to 1.0% of the whole composition by weight.

When mixtures of phosphorus containing compounds and hindered phenol containing compounds are used the ratio of phosphorus containing compound to hindered phenol containing compound may vary from 1:99 or 99:1% by weight of the additives. Mixtures of several types of phosphorous containing compounds with several types of hindered phenolic compounds are also envisioned. Examples of hindered phenol compounds are, for instance: 1,3,5-trimethyl-2,4,6-tris(3, 5-di-tertbutyl-4-hydroxybenzyl)benzene (IRGANOX 1330 from Ciba Geigy Co.), 3,5-di-tertbutyl-4-hydroxyhydrocinnamic acid triester with 1,3,5-tris(2-hydroxyethyl)-S-triazine-2,4,6-(1H,3H,5H)-trione (IRGANOX 3125 from Ciba Geigy Co.), tetrakis [methylene-(3,5-di-tertbutyl-4-hydroxycinnimate)]methane (IRGANOX 1010 from Ciba Geigy Co.), o,o-di-n-octadecyl-3,5-di-tertbutyl-4-hydroxy benzyl phosphonate (IRGANOX 1093 from Ciba Geigy Co.) N,N'-1,6-hexanediyl bis[3,5-(1,1-dimethylethyl)-4-hydroxy benzene propanamide (IRGANOX 1098 from Ciba Geigy Co.) 2,2'-oxamido bis-[ethyl-3-(3,5-di-tertbutyl-4-hydroxyphenyl)propionate] (NAUGARD XL-1 from Crompton Co.) and 6-[3-(3-t-butyl-4hydroxy-5-methyl)propoxy]-2,4,8,10-tetrat-butyldibenz[d,f][1,3,2]-dioxaphosphepin (SUMILIZER GP from Sumitomo Co.)

One example of a phosphonite compounds is PEPQ (from Clairant Co.), which is a biphenyl based di tert butyl phenyl phosphonite mixture produced by condensation of 2,4-di tert-butyl phenol with the Friedel Crafts addition product of phosphorus trichloride and biphenyl. Other examples are described in U.S. Pat. Nos. 3,825,629, 3,962,175 4,075,163.

Polyetherimide sulfone resins are made by the reaction of a dianhydride, or chemical equivalent with a diamine. Examples of dianhydrides are shown in formula (I):

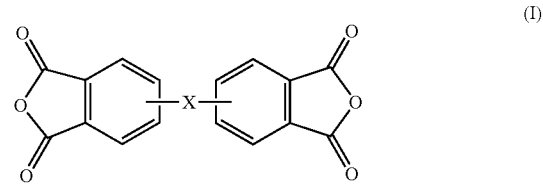

(I)

wherein X is —O—, —S—, —SO$_2$—, —(C=O)—, —Ar—, —O—Ar'—O— or —S—Ar"—S—. Ar, Ar' and Ar" represent aryl or polyaryl functionality independently selected from substituted and unsubstituted divalent aromatic radicals. In one embodiment X can contain a —O—, —S—, —SO$_2$—, —Ar—, —O—Ar'—O— or —S—Ar"—S linkage wherein the divalent bonds of said group are in the 3,3', 3,4', 4,3', or the 4,4' positions, and wherein Ar, Ar' and Ar" include, but are not limited, to divalent radicals of formula (II):

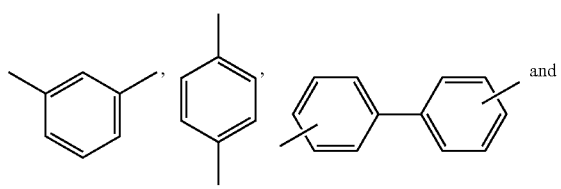

(II)

-continued

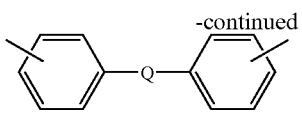

X in formula (I) includes but is not limited to substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III):

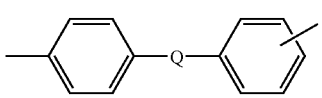

(III)

wherein Q includes but is not limited to a divalent moiety selected from the group consisting of —O—, —S—, —(C=O)—, —SO$_2$—, C$_y$H$_{2y}$— (y being an integer from 1 to 10), and halogenated derivatives thereof, including perfluoroalkylene groups.

Examples of the moiety "X" also include those derived from the dihydroxy-substituted aromatic hydrocarbons of the formula (IV):

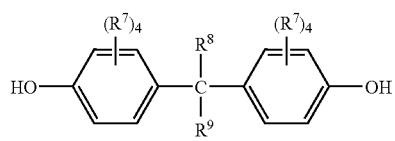

(IV)

where each R$^7$ is independently hydrogen, chlorine, bromine, or a C$_{1-30}$ monovalent hydrocarbon or hydrocarbonoxy group, and R$^8$ and R$^9$ are independently hydrogen or a C$_{1-30}$ hydrocarbon group.

In various embodiments the moiety "X" may be derived from dihydroxy-substituted aromatic hydrocarbons disclosed by name or formula (generic or specific) in U.S. Pat. Nos. 2,991,273, 2,999,835, 3,028,365, 3,148,172, 3,271,367, and 3,271,368. In some embodiments of the invention, such dihydroxy-substituted aromatic hydrocarbons include bis(4-hydroxyphenyl)sulfide, 1,4-dihydroxybenzene, 4,4'-oxydiphenol, 2,2-bis(4-hydroxyphenyl)hexa fluoropropane, and mixtures of the foregoing dihydroxy-substituted aromatic hydrocarbons. In other embodiments, such dihydroxy-substituted aromatic hydrocarbons include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; resorcinol; C$_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide. In same cases mixtures of two or more of these anhydrides may be used to prepare the polyimide.

Illustrative, non-limiting examples of aromatic dianhydrides for synthesis of thermoplastic polyetherimide sulfones comprise 4,4'-oxydiphthalic anhydride, 3,4'-oxydiphthalic anhydride, 3,3'-oxydiphthalic anhydride, sulfur diphthalic anhydride, benzophenone dianhydride, sulfone diphthalic anhydride, bisphenol A diphthalic anhydride, biphenol diphthalic anhydride, resorcinol diphthalic anhydride, hydroquinone, diphthalic anhydride diphenyl sulfone tetracarboxylic dianhydride, diphenyl sulfide tetracarboxylic dianhydride, hydroquinone diphthalic anhydride, resorcinol diphthalic anhydride, 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy) diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, bisphenol-A dianhydride, benzophenone dianhydride, pyromellitic dianhydride, biphenylene dianhydride and oxydiphthalic anhydride, as well as various mixtures thereof.

In one embodiment, the polyetherimide sulfone comprises, for example, imide linkages derived from 4,4'-bisphthalic anhydride structural units of formula (V):

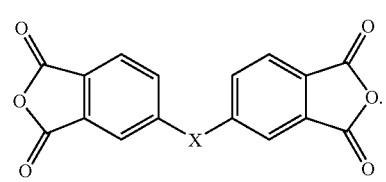

(V)

In one embodiment, the polyetherimide sulfone comprises greater than or equal to 50 mole % of units derived from oxydiphthalic anhydride. Within this range the polyetherimide sulfone can comprises greater than or equal to 75 mole % of units derived from oxydiphthalic anhydride. Also within this range the polyetherimide sulfone can comprise greater than or equal to 90 mole % of units derived from oxydiphthalic anhydride. The polyetherimide sulfone comprises less than or equal to 100 mole % of units derived from oxydiphthalic anhydride.

The term dianhydride used herein is understood to include chemical equivalents of dianhydrides that can react with diamines to form imide linkages. Such dianhydride chemical equivalent include, for example, tetra carboxylic acids, tetra carboxylic esters, carboxylic acid esters, carboxylic anhydride esters, carboxylic anhydride acids, or mixtures thereof capable of forming imide linkages by reaction with diamines. Illustrative, non limiting examples of a derivatized anhydride group which can function as a chemical equivalent for the dianhydride in imide forming reactions, includes dianhydride derivatives of the formula (VI):

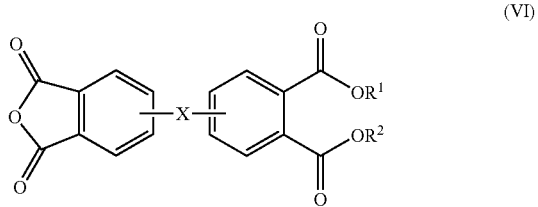

(VI)

wherein $R_1$ and $R_2$ of formula (VI) can be any of the following: hydrogen; an alkyl group; an aryl group. $R_1$ and $R_2$ can be the same or different to produce an anhydride acid, an anhydride ester, and an anhydride acid ester.

Additional examples of anhydride functional equivalents may include dianhydride derivatives which have two derivatized anhydride groups, such as for example, where the dianhydride derivative is of the formula (VII):

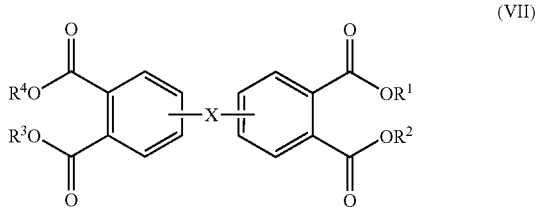

(VII)

wherein $R_1$, $R_2$, $R_3$ and $R_4$ of formula (VII) can be any of the following: hydrogen; an alkyl group, an aryl group. $R_1$, $R_2$, $R_3$, and $R_4$ can be the same or different to produce diacids, diesters, and acid esters.

The diamine, as described above, has at least one sulfone linkage, for example as shown in aryl diamino sulfones of the formula (X):

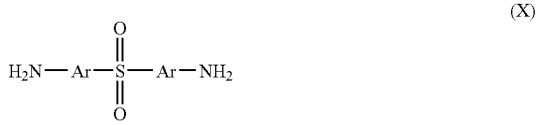

(X)

wherein Ar can be an aryl group species containing a single or multiple rings. Several aryl rings may be linked together, for example through ether and or sulfone linkages. The aryl rings may also be fused. In some embodiments, the amine groups of the aryl diamino sulfone can be meta or para to the sulfone linkage. Aromatic diamino sulfones include, but are not limited to, diamino diphenyl sulfone (DDS) such as 4,4'-diaminodiphenylsulfone and 3,3'-diaminodiphenylsulfone, bis (aminophenoxy phenyl)sulfones (BAPS) such as bis(4-(4-aminophenoxy)phenyl)sulfone and bis(4-(3-aminophenoxy) phenyl)sulfone, and bis aminophenoxy sulfone.

The diamine comprising a sulfone linkage may be used in combination with non-sulfone diamines. Examples of non-sulfone diamines are shown in formula (VIII):

$$H_2N-R-NH_2 \qquad (VIII)$$

wherein the moiety R in formula (VIII) includes but is not limited to substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III):

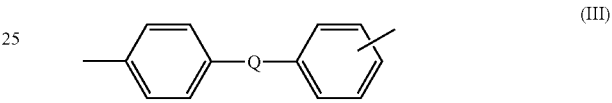

(III)

wherein Q includes but is not limited to a divalent moiety selected from the group consisting of a covalent bond, —O—, —S—, —(C=O)—, —$C_yH_{2y}$— (y being an integer from 1 to 10), and halogenated derivatives thereof, including perfluoroalkylene groups.

In other instances non-sulfone diamines of formula (IX) are employed where Y is —O—, —S—, —(C=O)—, —Ar—, —O—Ar'—O— or —S—Ar"—S—. Ar, Ar' and Ar" represent aryl or polyaryl functionality independently selected from substituted and unsubstituted divalent aromatic radicals

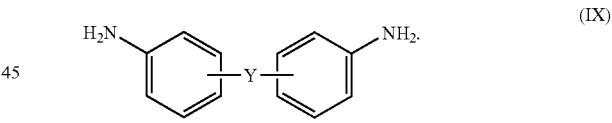

(IX)

Exemplary non-sulfone diamines include, but are not limited to, 4,4'-bis(3-aminophenoxy)biphenyl, 4,4'-bis(4-aminophenoxy)biphenyl, meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,2-bis(4-aminophenyl) cyclobutene-3,4-dione, 1,3-bis(3-aminophenoxy)benzene, 1,3-bis(4-aminophenoxy)benzene, 1,4-bis(4-aminophenoxybenzene), 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, 3,3'-diaminobenzophenone, 4,4'-diaminodiphenylmethane, 4,4'-diaminodiphenyl ether, 3,3'-diaminodiphenylmethane, benzidine, 3,3'-dimethylbenzidine, 3,3'-dimethoxybenzidine, 4,4'-diaminodiphenylsulfide, 2,2'-bis(4-aminophenyl)

propane; bis(p-beta-methyl-o-aminophenyl)benzene; 1,3-diamino-4-isopropylbenzene; 1,2-bis(3-aminopropoxy) ethane; diamino benzanilide, aminophenoxy biphenyl, bis aminophenoxy benzene, bis(p-beta-amino-t-butylphenyl) ether; 1,5-diaminonaphthalene; 2,4-bis(beta-amino-t-butyl) toluene; bis aminophenoxy fluorene, and m-xylylenediamine. Mixtures of the foregoing non-sulfone diamines can also be used.

The polyetherimide sulfone resins comprise more than 1, typically 10 to 1000, or, more specifically, 30 to 500 structural units of formula (XII).

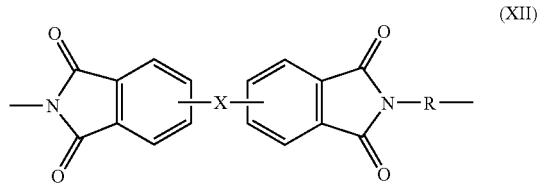

wherein X is —O—, —S—, —SO$_2$—, —(C=O)—, —Ar—, —O—Ar'—O— or —S—Ar"—S— and R is independently selected from substituted and unsubstituted divalent aromatic radicals comprising a sulfone linkage. Ar, Ar' and Ar" represent aryl or polyaryl functionality. In one embodiment R comprises at least two aromatic rings having a —SO$_2$— linkage wherein the divalent bonds of the —SO$_2$— group are in the 3,3', 3,4', 4,3', or the 4,4' positions.

The polyetherimide sulfones may have at least 50 mole % of linkages containing at least one aryl ether group. In other instances polyetherimde sulfones will have at least 50 mole % of linkages containing and at least one aryl sulfone group. In other cases at least 50 mole % of the imide linkages will contain at least one aryl ether and at least one aryl sulfone group and two imide linkages.

The polyetherimide sulfones may also include polyetherimide sulfones copolymers which include structural units derived from imidization reactions of mixtures of the dianhydrides anhydrides listed above having two, three, or more different dianhydrides, and a more or less equal molar amount of an organic diamine, or mixture of diamines. In addition, copolymers that have at least 50 mole % imide linkages derived from oxydiphthalic anhydrides, which includes derivatives thereof, and up to about 50 mole % of alternative dianhydrides distinct from oxydiphthalic anhydride are also contemplated. In other cases copolymers that have at least about 50 mole % imide linkages derived from diamino aryl sulfones are also of note.

Branching agents may also be employed in the reaction to prepare branched polyetherimide sulfones. Branching agents can be, for example, tri or tetra functional amines or anhydrides.

In some embodiments the polyetherimide sulfone resins, can be prepared from reaction of an aromatic dianhydride monomer (or aromatic bis(ether anhydride)monomer) with an organic diamine monomer wherein the two monomers are present in essentially equimolar amounts, or wherein one monomer is present in the reaction mixture at no more than about 5% molar excess, and sometimes less than about 2% molar excess in relation to the other monomer. Polyetherimide sulfones with an excess of anhydride end groups compared to the amount of amine end groups are required for improved melt stability when used in combination with at least one phosphorus containing stabilizer, or optionally further in combination with at least one hindered phenol compound. Such polyetherimide sulfones may be made by using an excess of dianhydride over diamine in the polymerization.

A variety of amine and anhydride and/or anhydride derivatives such as carboxylic acid, carboxylate salts, amide-acids and amide-carboxylate salts are also examples of possible end groups. It should be understood that the term "amine end groups" comprises end groups which are amines and any related end groups which are derived from amine end groups. It should also be understood that the term "anhydride end groups" includes end groups which are anhydrides and anhydride derivatives such as carboxylic acid, carboxylate salts, amide-acids and amide-carboxylate salts. All types, more than one type or essentially one type of these end groups may be present. In general total reactive end group concentrations (amine end group+anhydride end group) can be 1 to about 120 milliequivalents/kilogram (meq/kg) resin.

In one embodiment the polyetherimide sulfone has a total reactive end group (amine and anhydride end group) concentration of less than about 120 milliequivalents/kilogram resin (meq/kg). In one embodiment, polyetherimide sulfone has an anhydride end group concentration of 1-50 meq/kg, wherein the anhydride end group concentration is in excess of the amine end group concentration. In another embodiment the polyetherimide sulfone has anhydride end group concentration of 0.01 to 10.0 mole % based on the polymer wherein the anhydride end group concentration is in excess of the amine end group concentration.

The concentration of amine and anhydride end groups can be analyzed by various titration and spectroscopic methods well known in the art. Spectroscopic methods include, infrared, nuclear magnetic resonance, Raman spectroscopy, and fluorescence. Examples of infrared methods are described in J. A. Kreuz, et al., J. Poly. Sci. Part A-1, vol. 4, pp. 2067-2616 (1966). Examples of titration methods are described in Y. J. Kim, et al, Macromolecules, vol. 26, pp. 1344-1358 (1993). It may be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987).

Primary monoamines may be used to end cap or chain-stop the polyetherimide sulfone, for example, to control molecular weight. In a one embodiment primary monoamines comprise aromatic primary monoamines, illustrative examples of which comprise aniline, chloroaniline, perfluoromethyl aniline, naphthyl amines and the like. Aromatic primary monoamines may have additional functionality bound to the aromatic ring: such as, but not limited to, aryl groups, alkyl groups, aryl-alkyl groups, sulfone groups, ester groups, amide groups, halogens, halogenated alkyl or aryl groups, alkyl ether groups, aryl ether groups, or aryl keto groups. The attached functionality should not impede the function of the aromatic primary monoamine to control polyetherimide sulfone molecular weight. Exemplary aromatic primary monoamines may comprise one or more functionalities selected from the group consisting of hydrogen, ethers, sulfones and perfluoroalkyl groups and combinations of these functionalities.

Aromatic dicarboxylic acid anhydrides, that is aromatic groups comprising one cyclic anhydride group, may also be used to control molecular weight in polyetherimide sulfones. Illustrative examples comprise phthalic anhydride, substituted phthalic anhydrides, such as chlorophthalic anhydride, and the like. Said anhydrides may have additional functionality bound to the aromatic ring, illustrative examples of which comprise those functionalities described above for aromatic primary monoamines.

In one embodiment polyetherimide sulfone resins have a weight average molecular weight (Mw) of about 10,000 to about 100,000 daltons, as measured by gel permeation chromatography versus polystyrene standards in methylene chloride solvent. Some polyetherimide sulfone resins have a Mw from 10,000 to 50,000 daltons and have a polydispersity less than 3.0. Some polyetherimide sulfone resins have a polydispersity of 2.0 to 2.7. Polyetherimide sulfones may have a Tg greater than or equal to 200° C., or more, specifically, a Tg of 250° C. to 350° C. An exemplary polyetherimide sulfone, made from the polymerization of ODPA and DDS has a high Tg, typically around 310° C.

In cases where melt processability is desired, polyetherimide sulfones with at least two flexible groups in the polymer backbone may be employed. Some melt processable polyetherimide sulfones will have at least two flexible linkages in each polymer repeat unit. Examples of such flexible linkage are aryl ethers groups, aryl sulfone groups, aryl sulfide, diaryl alkylidene linkages and the like. In some embodiments melt processable polyetherimide sulfones will have both aryl ether and aryl sulfone linkages in at least 50 mole % of all imide linkages in the polymer. A measure of melt processability is to show a melt viscosity of less than or equal to 50,000 Pascal-seconds (Pa-s) at a temperature where the polymer does not fume or crosslink, thereby remaining a thermoplastic. In cases where the polyetherimide sulfone is melt processable it may be useful to have a melt viscosity, as measured by ASTM method D3835, from about 500 to 10,000 Pascal-seconds (Pa-s) at 350° C. to 425° C.

In one embodiment the polyetherimide sulfone resin is essentially free of benzylic protons. Benzylic proton functionality may react at high temperatures to accelerate reactions that change molecular weight in the melt. Essentially free of benzylic protons means that the polyimide sulfone product has less than 5 mole % of structural units, or less than 3 mole % structural units, or less than 1 mole % structural units derived from monomers and/or end cappers containing benzylic protons. In one embodiment essentially free of benzylic protons means that the polyetherimide sulfone resin has zero mole % of structural units derived from monomers and/or end cappers containing benzylic protons.

It is often useful to melt filter the polyetherimide sulfone resins using known melt filtering techniques to remove foreign material, carbonized particles, crosslinked resin or similar impurities. Melt filtering can occur during initial resin isolation and solvent removal or in a subsequent step. In general melt filtering using a filter with pore size sufficient to remove particles with a dimension of greater than or equal to about 100 microns may be employed. Filters to remove even finer particles may also be used.

The polyetherimide sulfone resins may optionally be further blended with reinforcements, fillers and colorants, as well as with other resins. Reinforcing fiber and fillers may comprise 5 to 50 weight percent and often 10 to 35 weight percent of the composition based on the total weight of the composition. Exemplary reinforcing fibers are glass, ceramic and carbon, and are generally well known in the art, as are their methods of manufacture.

Fillers and reinforcing agents, including nano-sized reinforcements, may be used alone or in combination. These include but are not limited to: carbon fibrils, mica, talc, clays, barite, calcium carbonate, wollastonite, milled glass, flaked glass, ground quartz, silica, zeolites, solid or hollow glass beads or spheres, and any combination of the foregoing. The compositions can also be modified with effective amounts of inorganic fillers, such as, for example, carbon fibers and nanotubes, metal fibers, metal powders, conductive carbon, and other additives including nano-scale reinforcements.

The polyetherimide sulfone resins described herein may optionally be further blended with other resins to give compositions with beneficial properties. Examples of suitable blend resins include, but are not limited to, polycarbonates, polyester carbonates, polyarylates, polysulfones, polyphenylene ethers, polyesters, liquid crystal polyesters, polyamides, polyetherether ketones, polyetherimides, polyphenylene sulfides, polyolefins such as high density polyethylene, polyfluoro polyolefins such a polytetrafluoro ethylene, and silicones and silicone copolymers. The blend resin may be combined with the polyetherimide sulfone resin in amounts of 0.3 wt. % to 95 wt. % based on the weight of the entire composition, depending on the resin. In other embodiments the blend resin may be added to the polyetherimide sulfone resin in an amount of 10-70 wt. % based on the weight of the entire composition.

The polyetherimide sulfone can also be optionally combined with known additives including colorants such as titanium dioxide, zinc sulfide and carbon black, mold release agents, lubricants, flame retardants, smoke suppressors, and anti-drip agents, for example, those based on fluoro polymers. Ultraviolet light stabilizers can also be added to the composition in effective amounts.

The polyetherimide sulfones can be blended with the aforementioned optional components by a variety of methods involving intimate admixing of the materials with any additional additives desired in the formulation. Because of the availability of melt blending equipment in commercial polymer processing facilities, melt blending procedures are generally preferred, although solution blending is also possible. The temperature of the melt in melt blending processes is preferably minimized in order to avoid excessive degradation of the resins. It is often desirable to maintain the melt temperature at 350° C. to 425° C. In some instances, the compounded polyetherimide sulfone, optionally containing additional components, exits melt processing equipment such as an extruder through small exit holes in a die and passing the strands through a water bath cools the resulting strands of molten resin. The cooled strands can be chopped into small pellets for packaging and further handling.

The polyetherimide sulfone composition may be formed into shaped articles by a variety of common processes for shaping molten polymers such as injection molding, compression molding, extrusion molding and gas assist injection molding. Examples of such articles include electrical connectors, enclosures for electrical equipment, flexible circuits, automotive engine parts, lighting sockets and reflectors, electric motor parts, power distribution equipment, communication equipment and the like including devices that have molded-in snap fit connectors. The polyetherimide sulfone composition can also be made into film and sheet.

In many instances it is desirable to coat the shaped article, or a portion of the article, with a metal surface. Such a coating may provide radio and electromagnetic wave shielding or reflectance. It may also provide the article with an electrically conductive pathway or surface. The coating may be of any metal; however, silver, copper, gold, nickel, aluminum, and chrome as well as alloys containing any of the foregoing are often preferred. The articles may have one or several metal coatings combining different metals or mixtures of metals. The metal surface may be applied using techniques well known in the art, for example, by sputtering, vacuum deposition or electroless metallization.

The composition is further illustrated by the following non-limiting examples.

EXAMPLES

Examples as described herein are designed by number. Comparative examples are denoted by letters.

Polyetherimides sulfones (PEIS) of Table 1 were made by the method of U.S. Pat. No. 4,835,249. Oxydiphthalic anhydride (ODPA) was reacted with diamino diphenyl sulfone (DDS) in o-dichlorobenzene (ODCB) with phthalic anhydride and heated with removal of water to build polymers that precipitated from solution. PEIS resins A, B & C were made by using approximately a 1.5 mole % excess of DDS or ODPA respectively to prepare anhydride end group rich and amine end group rich resins. End group concentration was determined by IR spectroscopy. Phthalic anhydride was used to end cap some of the polymer end groups. Polyetherimide sulfone A (PEIS-A) is amine end group rich whereas polyetherimide sulfones B and C (PEIS-B and PEIS-C) are anhydride end group rich as shown in Table 1. The mole % end groups of Table 1 are the differences between the IR peaks associated with the amine end group and anhydride end group. Composition is shown in mole %. PEIS-D was made by substitution of BPA-DA for ODPA and polymerization with DDS using a phthalic anhydride as a partial end cap.

The same process as above was used to make copolymers PEIS-E, F and G, by reaction with DDS and ODPA where a 20, 35 or 45 mole % portion of the ODPA was replaced with bisphenol A dianhydride (BPA-DA). All the copolymers are anhydride end group rich.

TABLE 1

Polyetherimide Sulfones

| Resins | mole % ODPA | mole % BPADA | mole % DDS | Mw | Tg° C. | End Groups |
|---|---|---|---|---|---|---|
| PEIS-A | 100 | 0 | 100 | 23000 | 310 | 0.87 amine |
| PEIS-B | 100 | 0 | 100 | 19000 | 307 | 1.39 anhyd. |
| PEIS-C | 100 | 0 | 100 | 20000 | 308 | 1.93 anhyd. |
| PEIS-D | 0 | 100 | 100 | 34500 | 258 | 0.12 anhyd. |
| PEIS-E | 80 | 20 | 100 | 23000 | 296 | 0.22 anhyd. |
| PEIS-F | 65 | 35 | 100 | 28000 | 283 | 2.10 anhyd. |
| PEIS-G | 55 | 45 | 100 | 28000 | 265 | 0.35 anhyd. |

Melt stability experiments. All melt stability experiments shown in FIGS. 1, 2 and 3 as well as Tables 2, 3, 4 and 5 were performed using a Haake Buchler HBI System 90 melt rheometer under an argon blanket. The rheometer-mixing bowl was operated at 50 rotations per minute (RPM) and 400° C. or 420° C. as indicated in the figures and tables. The cooling air option was used to moderate frictional heating. The mixing bowl was warmed to the desired temperature (400° C. or 420° C.) and 70 grams of dry polyetherimide sulfone powder or mixture of powders was added over 2-3 minutes. In examples with stabilizers, the indicated amounts of aryl phosphonite (PEPQ from Clariant Co.) and/or hindered phenol (IRGANOX 1330 from the Ciba Geigy Co.) were blended into the samples before introduction to the mixing bowl. A sample of about 1 gram of the polymer melt was removed after 10 minutes to test Tg and for end groups. End groups were determined by an infrared spectroscopy (IR) scan of freshly pressed films comparing absorbance for the amine ($NH_2$) stretch and the anhydride carbonyl stretch. After 10 minutes the ram was closed and the material allowed to mix at temperature for up to 2 hours. The melt stability of the polymer sample is reported as screw torque (meter•grams) vs. time. The torque of the blends is proportional to melt viscosity and molecular weight. Tg was determined by differential scanning calorimetry on the second scan as per ASTM method D3418.

TABLE 2

| | Examples | | | | | | | |
|---|---|---|---|---|---|---|---|---|
| | A | B | C | D | E | F | 1 | 2 |
| PEIS-A | 100 | 99.6 | 99.6 | 99.6 | 0 | 0 | 0 | 0 |
| PEIS-B | 0 | 0 | 0 | 0 | 100 | 99.6 | 99.6 | 99.6 |
| Hindered Phenol | 0 | 0.2 | 0 | 0.4 | 0 | 0.4 | 0.2 | 0 |
| Phosphonite | 0 | 0.2 | 0.4 | 0 | 0 | 0 | 0.2 | 0.4 |
| Torque at 420 C. | | | | | | | | |
| Torque 5 min | 1327 | 1822 | 3493 | 1905 | 801 | 622 | 520 | 869 |
| Torque 10 min. | 1901 | 6724 | 7097 | 2404 | 996 | 922 | 972 | 954 |
| Torque 20 min | 3081 | x-linked | 8183 | 3222 | 1766 | 1887 | 1282 | 1112 |
| Torque 40 min | 6473 | x-linked | 7930 | 6345 | 3779 | 4248 | 1676 | 1428 |
| Torque 60 min. | x-linked | x-linked | x-linked | 7562 | 5819 | 5266 | 2143 | 3135 |

Control examples A, B, C & D in Table 2 show the viscosity build for the same amine functional ODPA-DDS derived PEIS-A resin at 420° C. Torque at 5, 10, 20, 40 and 60 minutes mixing is shown. As can be seen in examples B and C containing added phosphonite, torque (and hence viscosity) increase faster than sample A with no additive, eventually yielding a crosslinked resin. Addition of hindered phenol alone in example D has only a slight beneficial effect in the amine rich resin polyetherimide sulfone-A (PEIS-A). The anhydride functional ODPA-DDS derived resin PEIS-B used in Control Examples E and F and Examples 1 and 2, shows different behavior. Addition of 0.4 wt % phosphonite, Example 2, shows much less torque increase than the control with no additive, Example E. Addition of 0.4% hindered phenol with no phosphonite, Example F, shows a small reduction on the torque increase. However the combination of 0.2% phosphonite with 0.2% hindered phenol, Example 1 is very effective in achieving low torque and hence better melt processability. The combination has reduced torque vs. Example 2, which has twice the phosphonite loading.

Table 3 and FIG. 3 show an example of the improved melt stability using an anhydride functional ODPA-DDS derived PEIS resin at 400° C. at 5, 20, 30 and 60 minutes mixing. Using a combination of phosphonite and hindered phenol, Example 3 shows reduced torque build compared the same resin with no additives, Example G.

TABLE 3

|  | Examples | |
| --- | --- | --- |
|  | G | 3 |
| PEIS-C | 100 | 100 |
| Hindered Phenol | 0 | 0.2 |
| Phosphonite | 0 | 0.2 |
| Torque at 400 C. | | |
| Torque 5 min | 1590 | 1380 |
| Torque 20 min | 2070 | 1690 |
| Torque 40 min | 4570 | 2190 |
| Torque 60 min. | 6290 | 2730 |

Example 4 in Table 4 shows the effect of 0.2 wt % phosphonite stabilizer (PEPQ) in combination with 0.2 wt % hindered phenol IRGANOX 1330 in a blend of the 85 wt % ODPA-DDS anhydride end group rich resin, PEIS-B, blended with 15 wt % of a BPADA-DDS resin PEIS-D. As can be seen in comparing Example H to Example 4, the torque at 400° C. is lower after extended time at temperature when the stabilizer combination is present in the anhydride functional polymer blend.

TABLE 4

|  | Examples | |
| --- | --- | --- |
|  | H | 4 |
| PEIS-B | 85 | 85 |
| PEIS-D | 15 | 15 |

TABLE 4-continued

|  | Examples | |
| --- | --- | --- |
|  | H | 4 |
| Hindered Phenol | 0 | 0.2 |
| Phosphonite | 0 | 0.2 |
| Torque at 400 C. | | |
| Torque 5 min | 674 | 839 |
| Torque 20 min | 1101 | 1275 |
| Torque 40 min | 1870 | 1427 |
| Torque 60 min. | 2849 | 1632 |
| Torque 90 min. | 4171 | 2098 |

Examples 5, 6, 7, and 8 in Table 5 show the effect of 0.2 wt % phosphonite stabilizer (PEPQ) alone or in combination with 0.2 wt % hindered phenol IRGANOX 1330 in a series of copolymers derived from polymerization of mixtures of ODPA and BPA-DA with DDS. PEIS-E is a copolymer with 80 mole % ODPA and 20 mole % BPA-DA, PEIS-F is a copolymer with 65 mole % ODPA and 35 mole % BPA-DA. PEIS-G is a copolymer with 55 mole % ODPA and 35 mole % BPA-DA. All copolymers were anhydride end group rich resins. As can be seen in comparing Examples I and J to Examples 5 and 6, the torque at 400° C. is lower after extended time at temperature when the phosphonite/hindered phenol stabilizer combination is present. Examples K and L show that the lower Tg PEIS-G copolymer, alone or with only hindered phenol compound, has a higher torque build at 400° C. than phosphonite containing blends of Examples 7 and 8.

TABLE 5

|  | Examples | | | | | | | |
| --- | --- | --- | --- | --- | --- | --- | --- | --- |
|  | I | 5 | J | 6 | K | L | 7 | 8 |
| PEIS-E | 100 | 99.6 | 0 | 0 | 0 | 0 | 0 | 0 |
| PEIS-F | 0 | 0 | 100 | 99.6 | 0 | 0 | 0 | 0 |
| PEIS-G | 0 | 0 | 0 | 0 | 100 | 99.6 | 99.6 | 99.6 |
| Hindered Phenol | 0 | 0.2 | 0 | 0.2 | 0 | 0.4 | 0 | 0.2 |
| Phosphonite | 0 | 0.2 | 0 | 0.2 | 0 | 0 | 0.4 | 0.2 |
| Torque at 400 C. | | | | | | | | |
| Torque 5 min | 812 | 669 | 528 | 456 | 485 | 477 | 415 | 383 |
| Torque 10 min. | 1097 | 907 | 787 | 577 | 696 | 671 | 425 | 525 |
| Torque 20 min | 1218 | 1228 | 1008 | 629 | 813 | 776 | 383 | 635 |
| Torque 40 min | 1904 | 1550 | 1695 | 855 | 1224 | 1133 | 514 | 803 |
| Torque 60 min. | 3348 | 2019 | 2540 | 1154 | 1931 | 1731 | 876 | 1065 |
| Torque 80 min. | 4957 | 2567 | 3110 | 1568 | 2955 | 2223 | 1527 | 1571 |
| Torque 100 min | 5489 | 2778 | 3543 | 1967 | 3477 | 2764 | 2078 | 1889 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A composition comprising:
   polyetherimide sulfone resin having anhydride end groups in an amount that is in excess of the amount of amine functional end groups; and
   a phosphorus containing stabilizer.

2. The composition of claim 1 further comprising a hindered phenol stabilizer.

3. The composition of claim 2 wherein the phosphorus containing stabilizer and the hindered phenol stabilizer have a molecular weight of over 500.

4. The composition of claim 1 wherein the phosphorus containing stabilizer is selected from the group consisting of aryl phosphites, aryl phosphonites and mixtures thereof.

5. The composition of claim 1 wherein the polyetherimide sulfone has a glass transition temperature of 250° C. to 350° C.

6. The composition of claim 1 wherein the polyetherimide sulfone has greater than or equal to 50 mole % of units derived from oxydiphthalic anhydride.

7. The composition of claim 1 wherein greater than or equal to 50 mole % of the polyetherimide sulfone repeating units comprise at least one aryl ether linkage, at least one aryl sulfone linkage and at least two aryl imide linkages.

8. The composition of claim 1 wherein the polyetherimide sulfone resin comprises structural units derived from an aromatic dianhydride selected from the group consisting of 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride; 2,2-bis(4-(3,4-dicarboxyphenoxy)phenyl)propane dianhydride; 4,4'-bis(3,4-dicarboxyphenoxy)diphenyl sulfide dianhydride; 4,4'-bis(3,4-dicarboxyphenoxy)benzophenone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy)phenyl]propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 1,4,5,8-naphthalenetetracarboxylic acid dianhydride; 3,4,3',4'-benzophenonetetracarboxylic acid dianhydride; 2,3,3',4'-benzophenonetetracarboxylic acid dianhydride; 3,3',4,4'-oxydiphthalic anhydride; 2,3,3',4'-oxydiphthalic anhydride; 3,3',4,4'-biphenyltetracarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; 2,2-bis(3,4-dicarboxyphenyl)hexafluoropropane dianhydride; and mixtures comprising at least two of the foregoing dianhydrides.

9. The composition of claim 1 wherein the polyetherimide sulfone resin comprises structural units derived from an aromatic diamine selected from the group consisting of meta-phenylenediamine; para-phenylenediamine; bis(4-aminophenyl)-2,2-propane; 4,4'-diaminodiphenyl, 3,4'-diaminodiphenyl, 4,4'-diaminodiphenyl ether; 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenylmethane; 4,4'-bis(4-aminophenoxy)biphenyl; 4,4'-bis(3-aminophenoxy)biphenyl, 1,5-diaminonaphthalene; 3,3-dimethylbenzidine; 3,3-dimethoxybenzidine; benzidine; bis(aminophenoxy)fluorene, 1,3-bis(3-aminophenoxy)benzene, 1,3-bis(4-aminophenoxy)benzene, 1,4-bis(4-aminophenoxy)benzene, bis(4-(4-aminophenoxy)phenyl)sulfone, bis(4-(3-aminophenoxy)phenyl)sulfone, 3,3'-diaminobenzophenone, 4,4'-diaminobenzophenone, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, diaminobenzanilide, and mixtures of two or more of the foregoing diamines.

10. The composition of claim 1 wherein the polyetherimide sulfone comprises structural units derived from an oxydiphthalic anhydride, or chemical equivalent selected from the group consisting of oxydiphthalic carboxylic acids, oxydiphthalic carboxylic esters, oxydiphthalic carboxylic acid esters, oxydiphthalic carboxylic anhydride esters, oxydiphthalic carboxylic anhydride acids, or mixtures thereof capable of forming imide linkages by reaction with diamines.

11. The composition of claim 1 wherein greater than or equal to 50 mole % of the imide linkages are derived from diamino aryl sulfones.

12. The composition of claim 1 wherein the polyetherimide sulfone has a melt viscosity, as measured by ASTM method D3835, at 350° C. to 425° C. of 500 to 10,000 Pascal-seconds.

13. The composition of claim 1 wherein the structural units of the polyetherimide sulfone are essentially free of benzylic protons.

14. The composition of claim 1 wherein the polyetherimide sulfone is essentially free of halogen atoms.

15. The composition of claim 1 wherein the polyetherimide sulfone resin comprises 0.1-5.0 mole % of linkages derived from a compound selected from the group consisting of; mono functional amines, mono functional carboxylic anhydrides, 1,2-dicarboxylic acids, 1,2-dicarboxylic esters, 1,2-dicarboxylic ester acids and mixtures thereof.

16. The composition of claim 1 wherein the polyetherimide sulfone resin has a weight average molecular weight of 10,000 to 50,000 grams/mole.

17. The composition of claim 1 wherein the polyetherimide sulfone has an anhydride end group content, in excess of the amount of amine end groups present, that is 1-50 meq/kg of polyetherimide.

18. A process to prepare a stabilized polyetherimide sulfone resin comprising
   preparing polyetherimide sulfone resin having an excess of anhydride end groups compared to amine end groups; and
   combining said polyetherimide sulfone resin with a phosphorus containing stabilizer.

19. The process of claim 18 wherein the stabilized polyetherimide sulfone resin is melt processed at 350-425° C.

20. A composition comprising a phosphorus containing stabilizer and a polyetherimide sulfone resin having greater than or equal to 50 mole % of units derived from oxydiphthalic anhydride, wherein the polyetherimide sulfone has an amount of anhydride end groups in excess of the amount of amine end groups.

21. A composition comprising a phosphorus containing stabilizer and a polyetherimide sulfone resin having greater than or equal to 50 mole % of units derived from oxydiphthalic anhydride and a diamino aryl sulfone, wherein the polyetherimide sulfone has an amount of anhydride end groups in excess of the amount of amine end groups.

* * * * *

UNITED STATES PATENT AND TRADEMARK OFFICE
Certificate

Patent No. 7,411,014 B2                                                         Patented: August 12, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert R. Gallucci, Mt. Vernon, IN (US); Jon M. Malinoski, Evansville, IN (US); and Roy Ray Odle, Mt. Vernon, IN (US).

Signed and Sealed this Seventeenth Day of November 2009.

HAROLD Y. PYON
*Supervisory Patent Examiner*
Art Unit 1796